US006695695B2

(12) United States Patent
Angel

(10) Patent No.: US 6,695,695 B2
(45) Date of Patent: Feb. 24, 2004

(54) ELECTRONIC VIDEO POKER METHOD AND SYSTEM HAVING MULTIPLE POKER HANDS

(75) Inventor: Mark Angel, Las Vegas, NV (US)

(73) Assignee: Gaming Concepts and Design, LLC, Las Vegas, NV (US)

(*) Notice: Subject to any disclaimer, the term of this patent is extended or adjusted under 35 U.S.C. 154(b) by 57 days.

(21) Appl. No.: 10/038,687

(22) Filed: Jan. 4, 2002

(65) Prior Publication Data

US 2003/0130023 A1 Jul. 10, 2003

(51) Int. Cl.$^7$ .......................... A63F 13/00; A63F 9/24; G06F 17/00; G06F 19/00

(52) U.S. Cl. .............................. 463/13; 463/9; 463/10; 463/11; 463/12; 463/20

(58) Field of Search ........................ 463/10–13, 20–25, 463/40–42; 273/292, 237

(56) References Cited

U.S. PATENT DOCUMENTS 4,643,421 A 2/1987 Meyer et al.
5,382,025 A * 1/1995 Sklansky et al. ........... 273/292
5,688,174 A 11/1997 Kennedy
5,723,950 A 3/1998 Wei et al.
5,732,950 A 3/1998 Moody
5,816,915 A * 10/1998 Kadlic ......................... 463/13
5,816,916 A 10/1998 Moody
5,823,873 A 10/1998 Moody
5,833,536 A 11/1998 Davids et al.
6,050,568 A 4/2000 Hachquet
6,129,357 A * 10/2000 Wichinsky .................. 273/292
6,135,883 A 10/2000 Hachquet
6,196,547 B1 * 3/2001 Pascal et al. ............... 273/292
6,203,428 B1 3/2001 Giobbi et al.
6,224,485 B1 5/2001 Dickinson et al.
6,254,481 B1 7/2001 Jaffe
6,409,602 B1 * 6/2002 Wiltshire et al. ............. 463/42
6,511,068 B1 * 1/2003 Sklansky et al. ........... 273/237

* cited by examiner

*Primary Examiner*—Teresa Walberg
*Assistant Examiner*—Robert Mendoza
(74) *Attorney, Agent, or Firm*—Rob L. Phillips; Quirk & Tratos

(57) ABSTRACT

A video implemented casino card game deals multiple hands. In a preferred embodiment the game includes a means for simulating a plurality of players on a game display. Each simulated player is dealt a hand of cards pursuant to a predetermined card game selected by a game player. Subsequent to the initial deal, the game player selects which hand to play. Once the hand has been selected, each hand is fully played. Only the game player's hand is fully revealed during play. Based on the game player's final cards, the player is paid according to a pay table. Thereafter, all hands are revealed and the game player is paid a bonus amount if the player's selected hand is the highest hand of the dealt hands. In a card game requiring a draw, or decision, unselected card hands are played according to a preprogrammed methodology within a gaming machine's internal microprocessor.

13 Claims, 12 Drawing Sheets

ELECTRONIC VIDEO POKER METHOD AND SYSTEM HAVING MULTIPLE POKER HANDS

FIELD OF INVENTION

The present invention relates generally to an electronic card game. More particularly, an electronic card game that affords a player the opportunity to receive a first payout and a bonus payout. Said first payout based on a standard pay table associated with the overall card hand achieved and said bonus payout based on a player achieving a best hand in comparison to a plurality of hands.

DESCRIPTION OF THE PRIOR ART

While any competitive card game can be played according to the present invention, poker is used by way of example throughout this specification. Poker is the most popular card game in the world and has been for centuries. Casinos have long benefitted from both live poker games and electronic video poker machines. "Video poker", as it is commonly known, first consists of a player inserting a wager into a video poker machine. Thereafter, the player is dealt five face-up cards from a standard 52 card deck. The player then decides which of the five dealt cards to hold and which to discard. The discards are replaced by new dealt cards from the remaining cards in the deck. The player, according to predefined winnings hands and a pre-established pay table, is paid for the resultant poker hand (e.g. 4000 coins for a royal flush, 250 coins for 4 of a kind, etc.).

Many variations of video poker are disclosed in the patent literature. For example, U.S. Pat. Nos. 5,732,950, 5,816,916 and 5,823,873 all to Moody disclose video poker games which allow simultaneous play of multiple poker hands based on identically held cards. In other words, the player can hold the best cards in a first hand and the identical cards will be transposed to multiple hands whereby the player can draw into the selected best cards in multiple hands. The Moody patents provide players with more opportunities to win prizes and thus have been very successful in practice.

However, the common theme present in all video poker games is that the player is awarded a prize based on the player's hand(s) alone. Playing video poker over time can become repetitive since only the player's poker hand is considered. Therefore, the continued need exists for increasing the excitement and realism associated with video poker games.

The present invention overcomes the referenced deficiencies existing in the prior art, namely the lack of inherent excitement with traditional video poker games. By allowing increased player interaction and multiple payouts, the present invention provides an exciting new element to video poker games.

SUMMARY OF THE INVENTION

An object of the present invention is to provide a more exciting and realistic video poker experience.

Another object of the present invention is to provide a simulated live poker game on an electronic apparatus.

Another object of the present invention is to provide multiple independent payouts based on a single poker hand whereby a bonus payout is based on a game player's resultant hand being the highest hand displayed.

Another object of the present invention is to provide a player a choice of multiple variations of poker games (i.e. hold'em and stud) not typically offered by a traditional video poker machine.

Another object of the present invention is to provide a means for a video poker machine to play poker hands pursuant to a preprogrammed method of play.

Another object of the present invention is to provide a more realistic experience by dealing cards in their traditional manner to multiple simulated players rather than dealing a single hand off the "top of the deck."

Another object of the present invention is to provide a fold option such that players may recover a portion of their initial wager when a portion of a dealt hand appears unlikely to result in a payout.

Yet another object of the present invention is to provide one or more bonuses not possible with traditional video poker games.

DISCLOSURE OF THE INVENTION

Unlike traditional video poker machines, which typically deal only five card draw poker, the present invention allows players to select from multiple variations of additional poker games. For example, hold'em, seven card stud, five card stud, five card draw, etc., and variations thereof can be played under the present invention.

The present invention adds excitement to traditional video poker by implementing additional player decisions and implementing a bonus payout based on a player's poker hand in comparison to other displayed poker hands. As a result, a gaming machine of the present invention initially deals multiple poker hands from which a player must decide which hand to play. The player then plays the selected hand while the remaining unselected hands are effectively played by the gaming machine. Once the selected game is completed (i.e. all cards have been dealt and all draws, if necessary, have been made), the player is paid an amount from a standard pay table based on the player's resultant hand and is further paid a bonus amount if the player's selected hand is the highest hand of the multiple hands dealt. The bonus amount can be any predetermined amount dependent on a desired payout percentage of the particular video poker machine operating the present invention. As with all gaming payouts, the payouts must be such that casinos have an overall advantage while players win with enough frequency to justify continued play.

As each poker game offered will have its own rules and strategy, a preprogrammed method of play, if necessary, is designed for certain poker games offered to players. In the examples set forth herein, only the game of five card draw will require a true preprogrammed method of play. Games including seven card stud and hold'em do not require a player draw and can therefore simply be dealt out by the gaming machine. By implementing a basic card strategy for draw games and the like, the preprogrammed method of play will seek to create a competitive and realistic atmosphere associated with a live poker game. Players of the present invention will not only root for the strength of their own hand, but will also root against the unselected hands.

In a preferred embodiment, the multiple poker hands are figuratively played by electronically simulated poker players. The simulated poker players may appear as cowboys, movie stars, athletes or any desired group of characters. The simulated players may be fictitious or may be genuine famous people. In this manner, the player is participating against other simulated players and hands rather than simply considering his own single hand. It is further preferred that players have the option to choose, from a pool of simulated players, which simulated players will participate in the selected game. For instance, the pool may include ten simulated cowboys from which a player may select five participants.

First Example of the Game and Method of Play

By way of a first example hold'em is considered. As known in the art, a player first places a wager by inserting coins, bills or credit cards into a gaming machine. The player is also given the choice of how many "coins" to play per game. Playing a maximum number of coins provides the player with certain advantages, including increased payouts, eligibility for progressive jackpots, and with the present invention, a fold option. After the wager is placed, the player selects, by means of a button, touchscreen or mouse, which poker game he or she desires to play (i.e. hold'em in this example)

Thereafter, the player is provided with a display of multiple (e.g. 10) simulated players from which to select. The player then uses the selection means described above to select a predetermined number (e.g. 5) of the ten players to participate in the game. While each of the examples described herein include simulated players, the multiple hands may be dealt on a gaming screen without corresponding simulated players. The simulated players are included to add realism and excitement to the preferred implementation of the present invention.

The game begins with each selected simulated player being dealt, in order, two face down cards from a standard 52 card deck. In addition, three common cards which will be used in each simulated player's hand, are dealt face down and spaced from the simulated hands.

The game player then selects which simulated hand to play. In this example, the selection is completely arbitrary. However, in an alternative embodiment one or both of the two face down cards may be dealt face up and the hand selection made prior to revealing the three common cards. In this example, once the player selects his or her hand, the two face down cards are exposed. Once the two cards are exposed, the player may elect to fold the hand and recover a portion of his or her initial wager. Preferably, the fold option is available to only players wagering the maximum number of coins. Assuming no fold, the three common cards are revealed and two additional common cards are dealt face up adjacent the original three common cards. The highest five card poker hand is made by combining the two player cards and the five common cards.

The player may then be awarded a first payout, depending on his or her resultant hand, according to a pre-established pay table. Accordingly, two pair may pay 5 coins and three of kind may pay 15 coins. Finally, all simulated hands are then exposed to reveal whether the player holds the highest five card poker hand at the simulated table, and if so, a bonus payout is awarded to the player.

Second Example of the Game and Method of Play

By way of a second example, a game of seven card stud is considered. As with the hold'em example, an initial wager is made, the game is selected and simulated players are selected. The gaming machine will then deal, from a standard 52 card deck, five poker hands in a traditional fashion. Seven card stud begins with each simulated player receiving, in order, two cards face down and one card face up. Based on the first three dealt cards, the game player selects the hand (and corresponding simulated player) he or she wants to play. The selection will be by the selection means described above and will likely be made on the basis of the single card showing. In other words, a player is likely to select a hand with an Ace showing as opposed to a five showing. However, any hand may be selected as the player's. Once the three initial cards are exposed, the player may elect to fold the hand and recover a portion of his or her initial wager. Again, it is preferred that the fold option be available to only players wagering the maximum number of coins. Assuming no fold, once the selection is made, the game player is dealt four cards face up while the simulated players receive three cards face up and a final card face down pursuant to traditional seven card stud. The cards are always dealt in order pursuant to conventional poker rules such that the game player's selected player receives the first card off the deck and the simulated player to the right (as you look at the screen) receives the next card and so on in a clockwise fashion until all hands are complete.

The player may then be awarded a first payout, depending on his or her resultant hand, according to a pre-established pay table. Accordingly, a straight may pay 20 coins and a royal flush may pay 4000 coins. Finally, all unselected simulated hands are then exposed to reveal whether the player holds the highest five card poker hand at the simulated table, and if so, a bonus payout is awarded to the player.

Third Example of the Game and Method of Play

By way of a third example, five card stud is considered. As with the hold'em and seven card stud, an initial wager is made, the game is selected and simulated players are selected. Thereafter, a first face up card and four face down cards from a standard 52 card deck are dealt to each simulated player. The game player then selects which hand to play. Once the selection is made, the game player's cards are revealed and, if applicable, the player is paid according to a standard pay table. Thereafter, all remaining hands are revealed and the game player is paid a bonus if the player's hand is the highest hand revealed. Preferably no fold option is available with the five card stud implementation.

Fourth Example of the Game and Method of Play

By way of a fourth example, five card draw is considered. As with the hold'em, seven card stud and five card stud examples, an initial wager is made, the game is selected and simulated players are selected. Thereafter, five face down cards from a standard 52 card deck are dealt, in order, to each simulated player. The game player then selects which hand to play. In this example, as all cards are face down, the selection is completely arbitrary. However, in alternative embodiments one or more of the cards may be dealt face up to afford the player a hint of each hand's strength prior to having to make the selection. Once the player has selected a poker hand to play, the selected hand will be revealed. While it is possible, it is not preferable to implement a fold option with five card draw. The player, in accordance with traditional video poker, then discards undesired cards which are replaced with new cards dealt from the standard 52 card deck. The cards are always dealt in order pursuant to conventional poker rules such that the game player always receives replacement cards first and the simulated player to the right (as you look at the screen) receives replacement cards and so on in a clockwise fashion.

The player may then be awarded a first payout, depending on his or her resultant hand, according to a pre-established pay table. Accordingly, a flush may pay 30 coins and a straight flush may pay 250 coins. Subsequent to the first payout, the remaining hands are exposed and played by the gaming machine according to a preprogrammed method of play described in detail below. If the player ultimately holds the highest poker hand at the simulated table, a bonus payout is awarded to the player. To add further excitement to the game, a bonus round is predicated on a game player receiving a predetermined hand (e.g. four of a kind). The bonus round consists of each of the simulated players being dealt a second bonus five card hand. The game player then plays each bonus hand dealt and receives a payout for each hand according to a standard pay table.

Although the examples are directed to hold'em, seven card stud, five card stud and five card draw respectively, any poker game or variation thereof may be played pursuant to the present invention.

DESCRIPTION OF THE EMBODIMENTS

The brains of a traditional video poker machine reside in a preprogrammed microprocessor in communication with certain memory devices. The microprocessor further includes, or is in communication with, a random number generator (RNG) that runs hundreds of hands per second (i.e. shuffles the deck) until the occurrence of a predetermined event (i.e. coin insertion, bet button is depressed or start button is depressed). Once the predetermined event occurs, the cards are situated in the deck and do not change their position until the next game is played. Therefore traditionally, the player receives initially the first five cards off the top of the deck and any draw cards off the top of the remaining deck.

The present invention provides a more realistic scenario whereby cards are dealt to each simulated player in order, rather than dealing a single player the first five cards off the top of the deck. Traditional poker is dealt clockwise, starting with the player to the left of the dealer, with each player receiving one card at a time until each player has their full poker hand. Therefore, unlike traditional video poker, if the top five cards in the deck form a flush, it means nothing since each of the simulated players will receive one of the cards.

Figure 1:
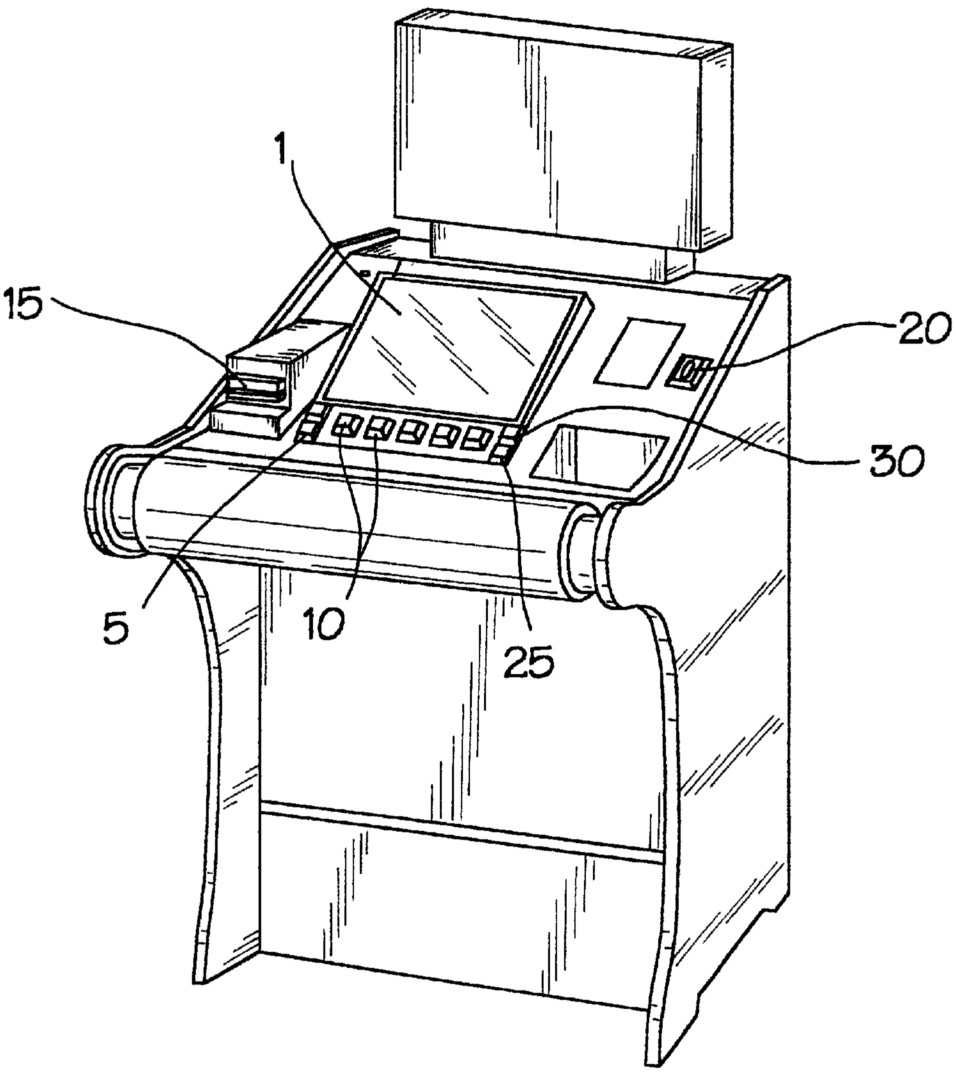
FIG. 1 is a front view of a traditional video poker machine.

Reference is now made to the figures wherein like parts are referred to by like numerals throughout. FIG. 1 illustrates the front of a traditional video poker machine, including a screen display 1, draw/deal button 5, hold/discard buttons 10, card reader 15, coin slot 20, bet maximum coins button 25 and bet one coin button 30. In addition to the external features illustrated in FIG. 1, the present invention requires a means to select simulated players and a player's hand. Although a touchscreen is the preferred means of selection, other means, including selection buttons, may be used.

Figure 2:
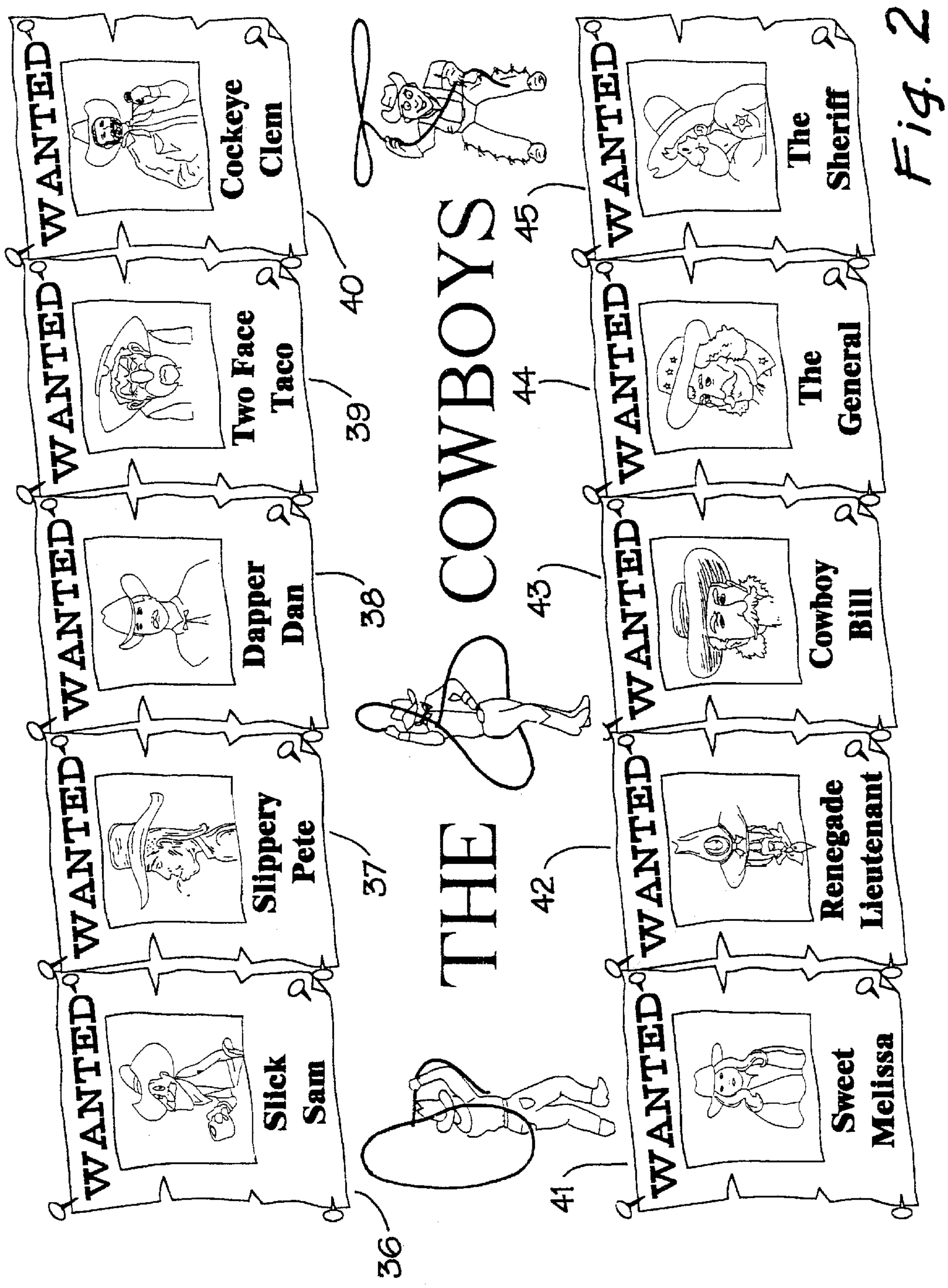
FIG. 2 is a simulated player selection screen of the present invention.

FIG. 2 illustrates a simulated player selection screen display having ten selection options 36–45. While a cowboy theme is illustrated on selection screen, any theme may be the basis for the present invention. For example, Hollywood celebrities or professional athletes may lend their likeness to a particular implementation of the present invention. Methods of simulating characters and/or symbols on a video screen are known in the art and, therefore, are not fully explored here. With a touchscreen the player will select, by touching the screen, the desired simulated players.

Figure 3:
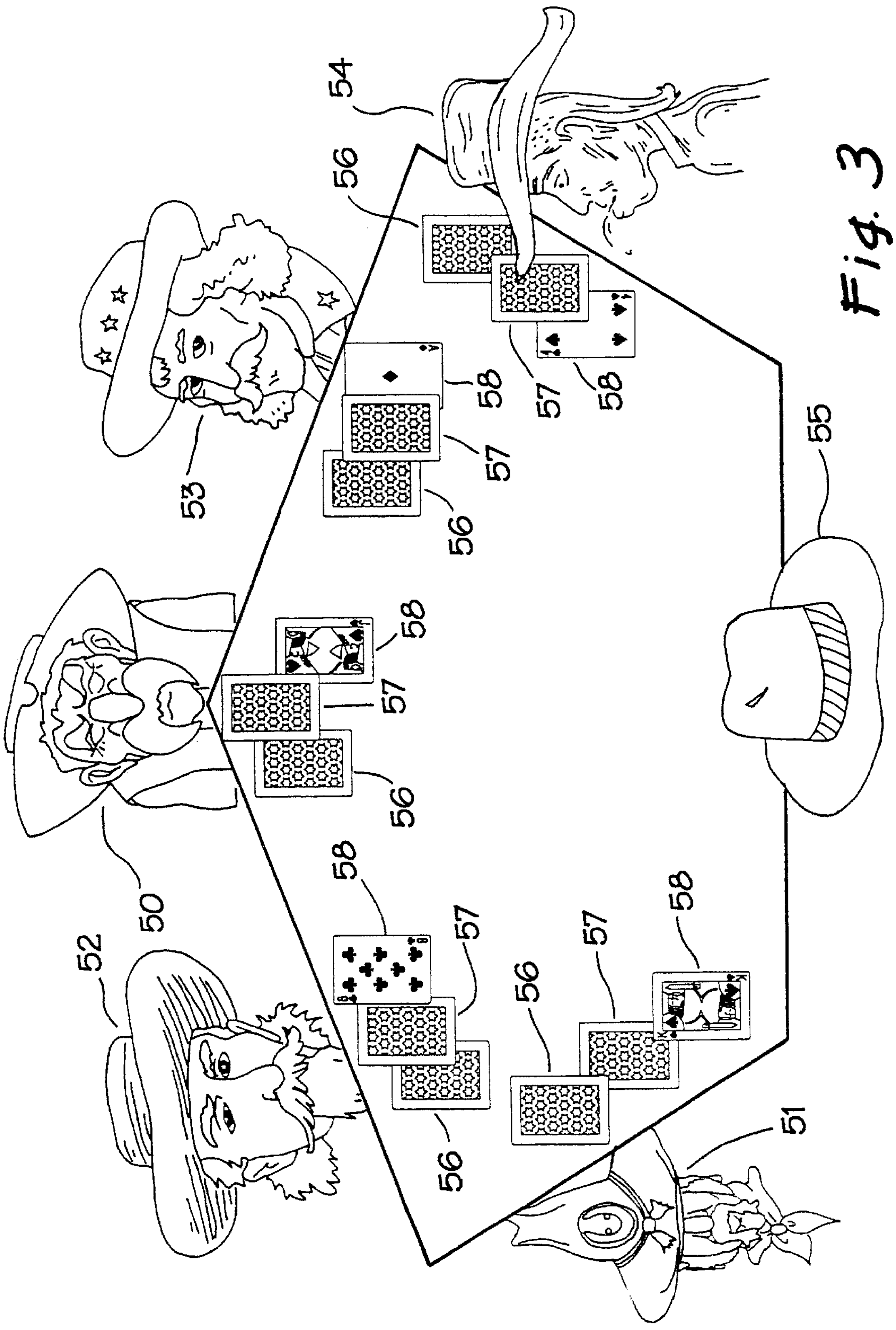
FIG. 3 is a simulated seven card stud screen once three initial cards have been dealt.
Figure 4:
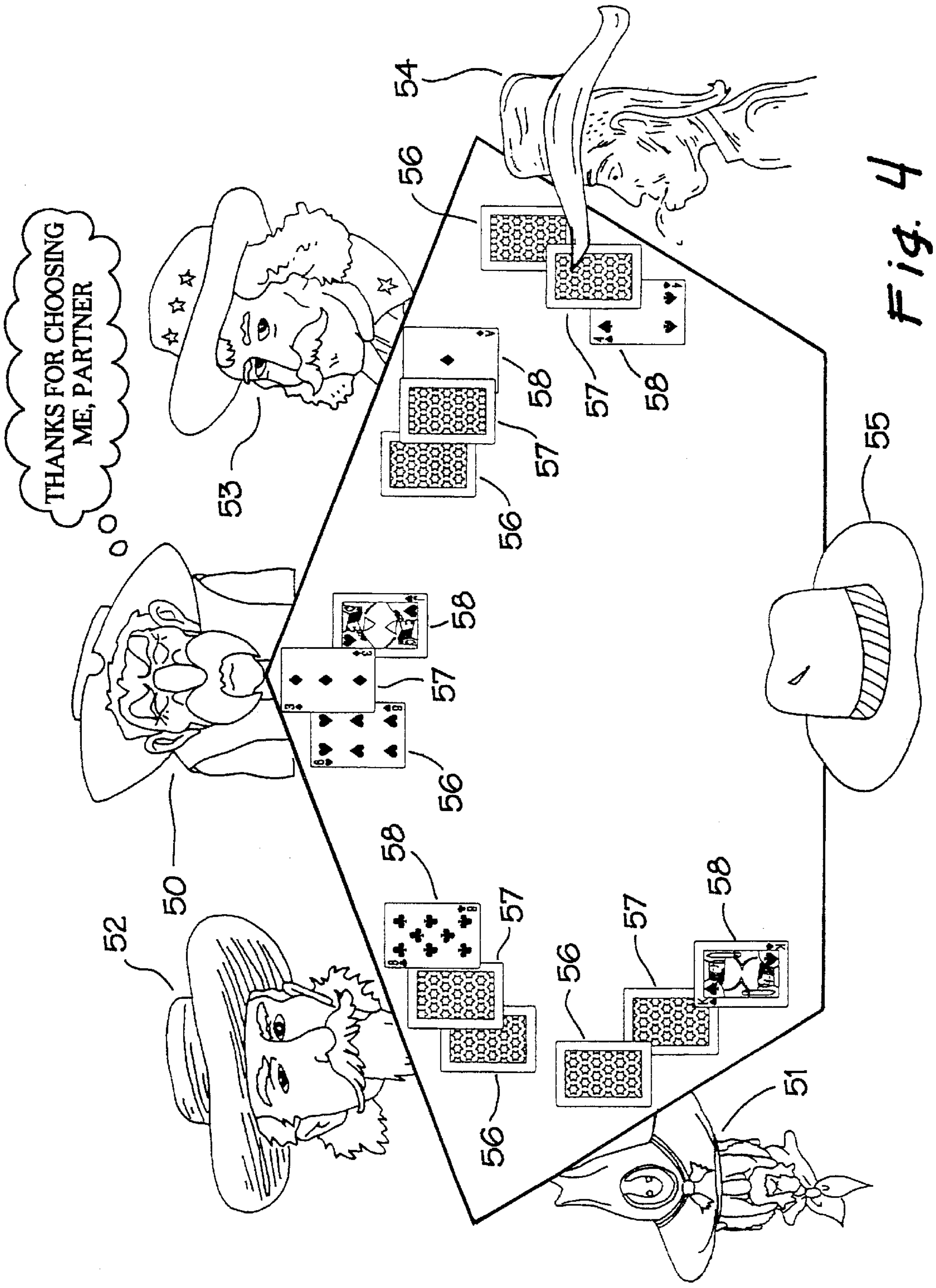
FIG. 4 is a simulated seven card stud screen once a hand has been selected by a game player.

Now referring to FIG. 3, a screen display depicting a seven card stud game is illustrated with the selected simulated players 50–54. Further illustrated is a simulated dealer 55 represented by a cowboy hat. Initially, each selected player 50–54 has two face down cards 56, 57 and one face up card 58 adjacent their table position. It is at this point in the game that the game player selects which hand to play. As a result of the hand selection, the player also selects a simulated player 50–54. Upon selection of the hand, the simulated player associated with the selected hand will be highlighted such that the player is assured the selection has been received by a gaming machine microprocessor or the like. Said highlight may take many forms, including increased brightness of the selected player, a flashing depiction of the selected player, written phrases adjacent the selected player, etc. In FIG. 4, selected player 50 is shown with such a phrase 56. The selection of player 50 also causes the two cards 56, 57 dealt face down to player 50 to be exposed. The deal continues with the player's 50 cards being dealt face up and the other players' 51–54 cards being dealt in the traditional seven card stud manner as described above. The player 50 is then paid, if a winning hand is held, according to a standard pay table based on the final cards received.

Figure 5:
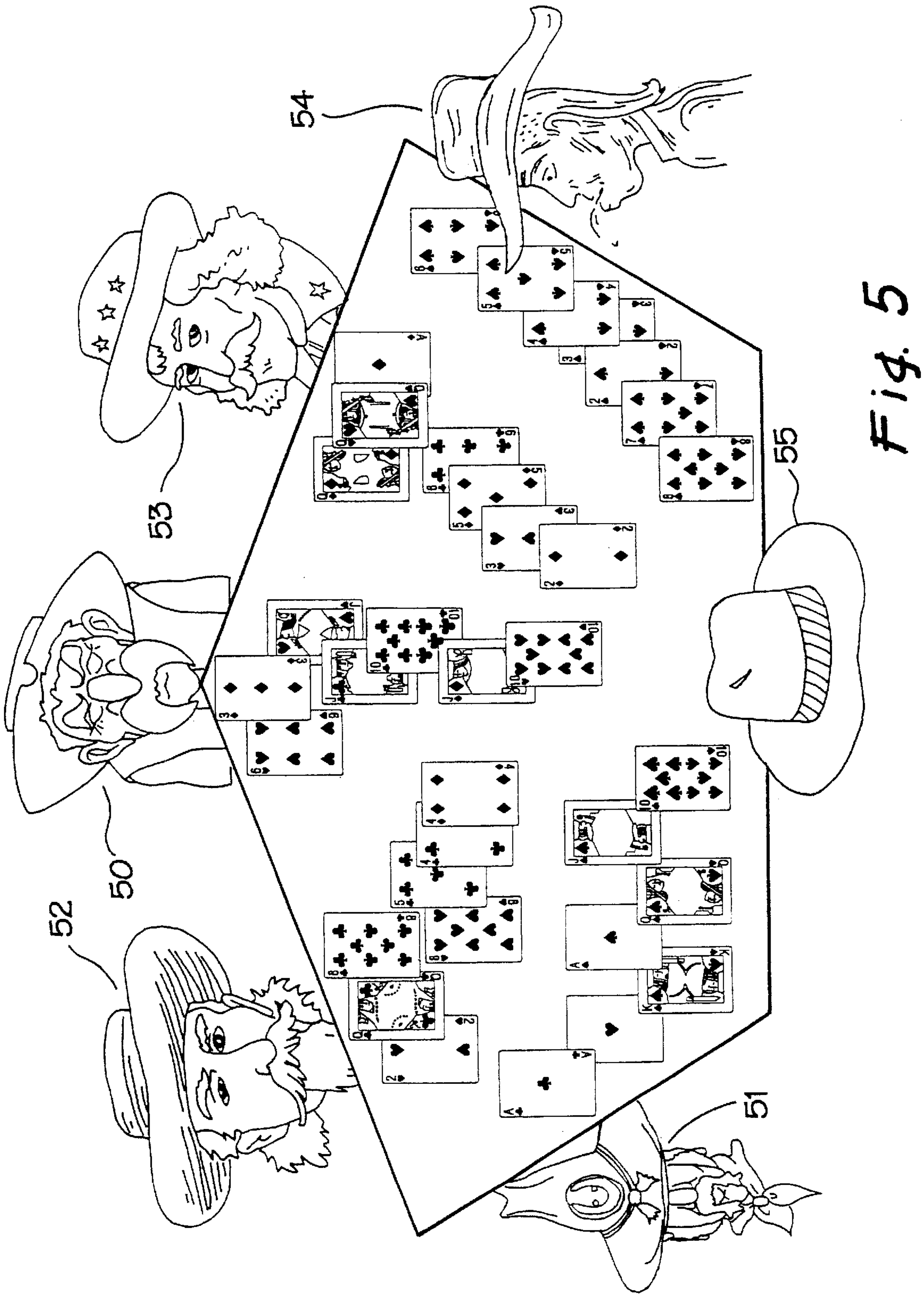
FIG. 5 is a simulated seven card stud screen once all cards have been dealt and exposed.

Thereafter, all hands are exposed as depicted in FIG. 5 to determine the highest hand at the table. If the player 50 holds the highest hand, the player 50 will then be paid a predetermined bonus amount. FIG. 5 illustrates a screen display with each simulated player 50–54, including the selected player 50, having all seven of their cards exposed. While not shown, means for highlighting the highest hand, include increased brightness of the winning hand, a flashing depiction of the winning hand, a simulated pot being placed upon said winning hand, etc.

While not shown, five card stud, as described previously, is dealt a first card face up and four remaining cards face down. The game player then selects which hand to play. Once selected, the remaining four cards are revealed and the player is paid according to a pre-established pay table. Thereafter, all simulated hands are revealed and the player is paid a bonus amount if the game player's hand is the highest hand revealed. As disclosed herein, the fold option is likely not an option with five card stud.

Figure 6:
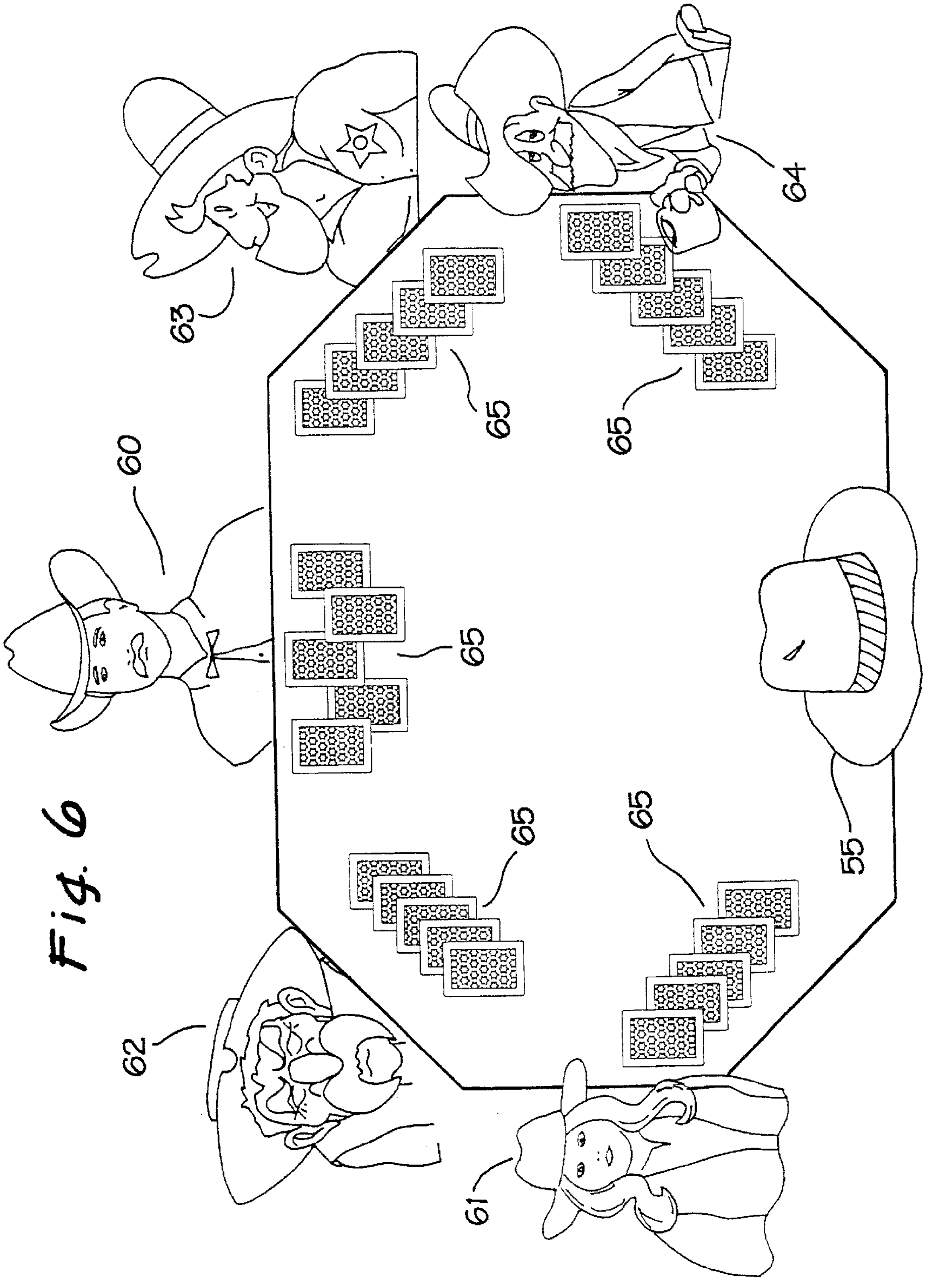
FIG. 6 is a simulated five card draw screen once five initial cards have been dealt.
Figure 7:
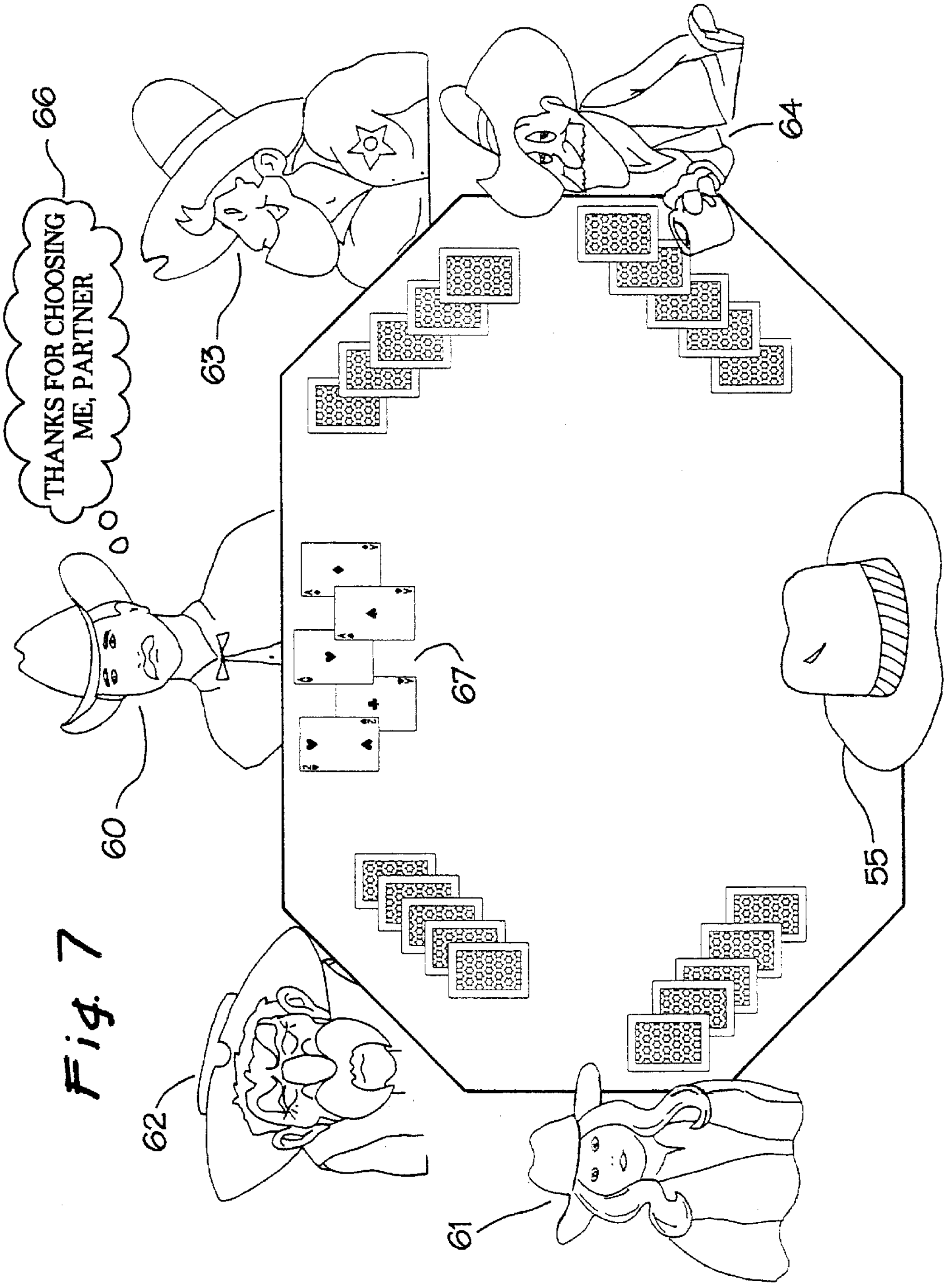
FIG. 7 is a simulated five card draw screen once a hand has been selected by a game player.
Figure 8:
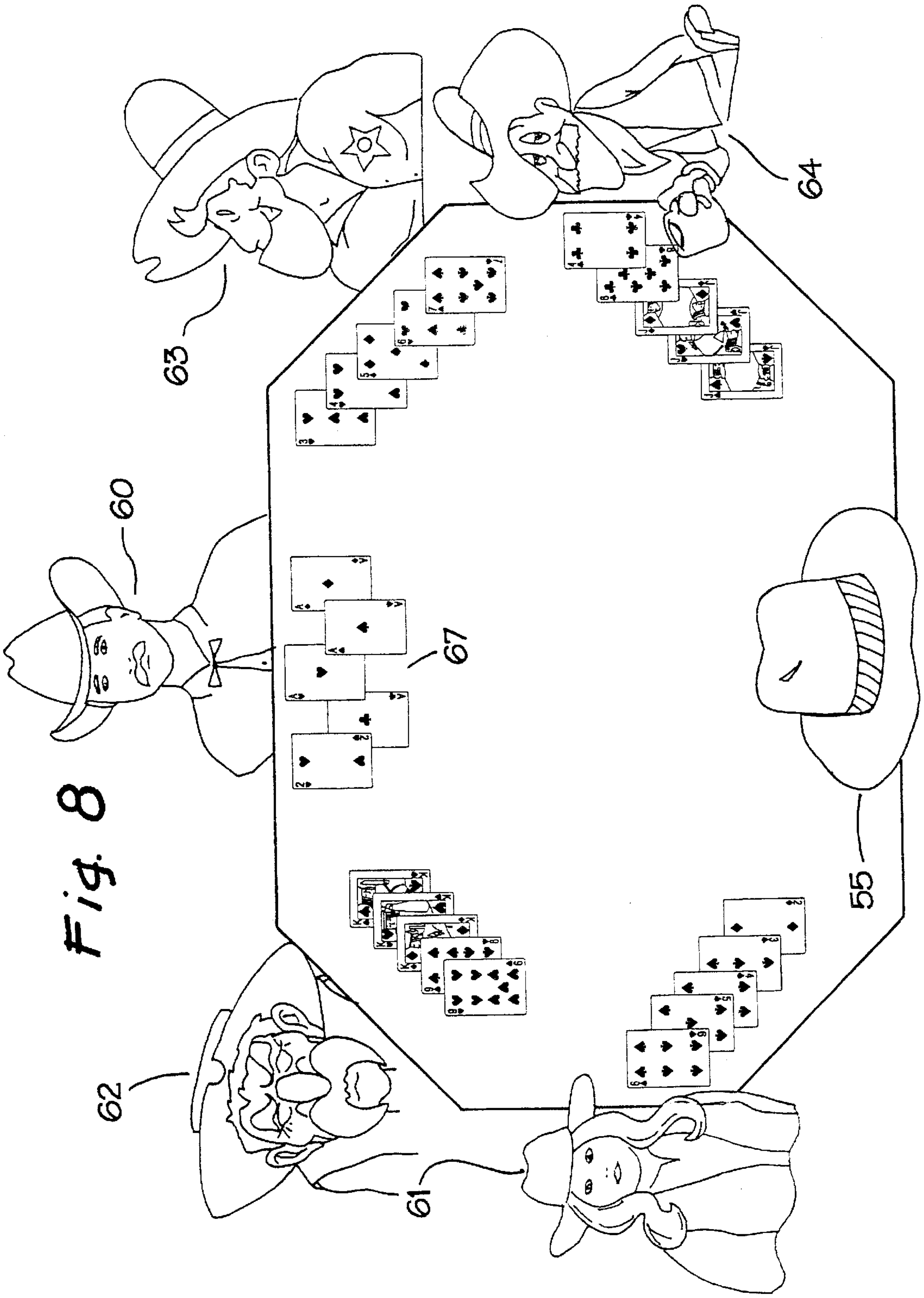
FIG. 8 is a simulated five card draw screen once all cards have been dealt, discarded, drawn and exposed.

FIG. 6 illustrates a five card draw screen display with each simulated player 60–64 having five cards dealt face down 65. It is at this point in the game that the game player selects which hand to play. FIG. 7 depicts the display once the game player has selected the hand to play. As a result of the hand selection, the player also selects a simulated player 60–64. In FIG. 7 player 60 has been selected as depicted by the player phrase 66 and exposed hand 67. FIG. 8 shows the screen display with each simulated player 60–64 having all cards exposed. The player 60 is paid according to a standard pay table based on the cards received by the player 60 and is paid a predetermined bonus amount if the player 60 holds the highest hand at the simulated table.

Figure 9:
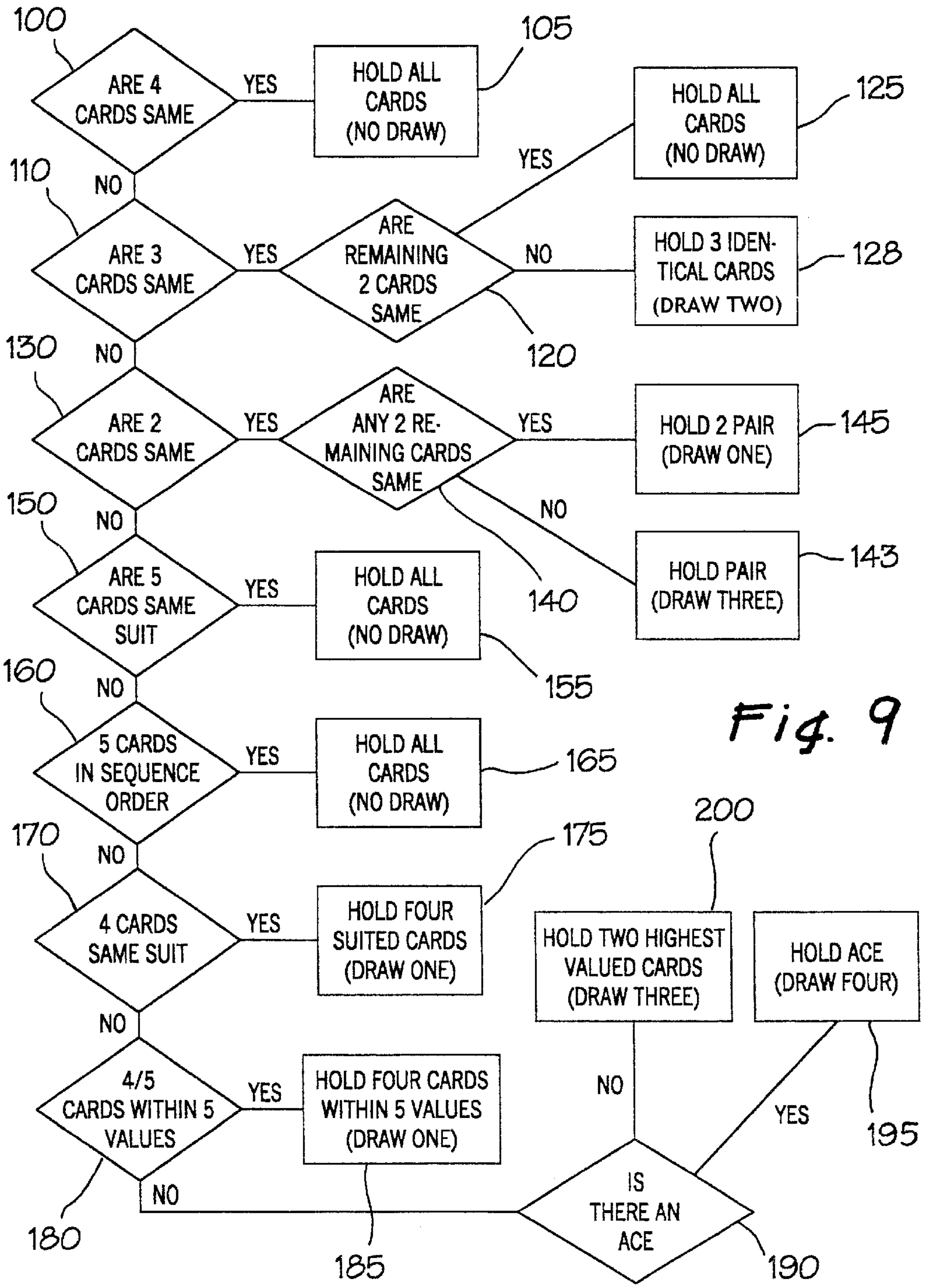
FIG. 9 is a flow chart of one embodiment of a preprogrammed method followed by a gaming machine microprocessor to play five card draw.

Unlike seven card stud or other poker games, five card draw requires players to fold certain cards in favor of new replacement cards. To insure a realistic poker setting, a gaming machine microprocessor is preprogrammed to decide which initially dealt cards to fold and which cards to hold with respect to the unselected hands. To insure realism, the preprogrammed decision-making process of the microprocessor follows a basic decision-making process followed by intelligent live poker players. By way of example, if a player is dealt a pair of Aces and three "junk" cards, the obvious choice is to hold the Aces and draw three new cards. FIG. 9 shows a flow chart indicating an embodiment of the decision making process followed by the preprogrammed microprocessor.

FIG. 9 illustrates a flow chart depicting a path followed by the microprocessor in playing said unselected five card poker hands. The chart does not consider "bluffs" or "bluffing" since they have no relevance in the present invention. The five cards as dealt are initially evaluated at step "ARE FOUR CARD VALUES IDENTICAL" 100 if yes, the entire hand is held at step "HOLD ALL CARDS" 105 (i.e. no draw). If no, step "ARE THREE CARD VALUES IDENTICAL" 110 is considered. If three card values are identical, then step "ARE THE REMAINING TWO CARDS IDENTICAL" 120 determines whether a full house (i.e. three cards of the same first value and two remaining cards of the same second value) has been dealt. If yes at step 120, the five cards are held at step "HOLD ALL CARDS" 125 and no draw is completed. If no at step 120, the three identical cards are held and two remaining cards are discarded at step "HOLD THREE IDENTICAL CARDS" 128 and replaced with two new cards. If no at step 110, step "ARE TWO CARDS IDENTICAL" 130 is considered. If yes at step 130, the program proceeds to step "ARE TWO OF THREE REMAINING CARDS IDENTICAL" 140. If yes at step 140, the two pair of identical cards are held at step "HOLD TWO PAIR" 145 and the unpaired card is discarded and replaced with a new card. If no at step 140, the two identical cards identified at step "ARE TWO CARDS IDENTICAL" 130 are held at step "HOLD PAIR" 143 and three cards are discarded and replaced with new cards. If no at step 130, the processor advances to step "ARE FIVE CARDS THE SAME SUIT" 150 if yes, the five suited cards are held at step "HOLD ALL CARDS" 155 and no draw occurs. If no at step 150, at step "ARE THE FIVE CARDS IN SEQUENTIAL ORDER" 160 the processor determines whether a straight has been dealt. If yes at step 160, the five cards are held at step "HOLD ALL CARDS" 165 and no draw occurs. If no at step 160, the processor proceeds to step "ARE FOUR CARDS THE SAME SUIT" 170 and if yes, the four suited cards are held at step "HOLD FOUR SUITED CARDS" 175 and the one unsuited card is discarded and replaced by a new card. If no at step 170, step "ARE FOUR OF THE FIVE CARDS WITHIN FIVE VALUES OF ONE ANOTHER" 180 determines whether four of the five cards can be made into a straight with the selection of one card. If yes at step 180, the four cards are held at step "HOLD FOUR CARDS WITHIN FIVE VALUES OF ONE ANOTHER" 185 and the remaining card outside of the five card values is discarded and replaced with a new card. If no at step 180, step "IS THERE AN ACE" 190 inquires whether an Ace is in the dealt hand. If yes at step 190, the Ace is held at step "HOLD ACE" 195 and the four remaining cards are discarded and replaced with four new cards. If no at step 190, the processor locates the two highest valued cards at step "HOLD TWO HIGHEST VALUED CARDS" 200. At step 200 the two highest valued cards are held and the three lower valued cards are discarded and replaced with new cards.

It must be understood that the preprogrammed method described herein is but one example. For instance, the preprogrammed strategy may include provisions for holding "kickers" or holding a four card flush instead of a dealt pair. Therefore, the method can be much more detailed but should follow a basic strategy to foster the appearance and feel of a live poker game. In other words, card players desire to play against other knowledgeable players, or a computer in this case.

In a preferred embodiment of the five card draw game, should the selected player 60 receive a predetermined hand (e.g. four of a kind) a bonus round will ensue. The bonus round consists of each of the simulated players being dealt a second bonus five card hand. The game player then plays each bonus hand dealt and receives a payout for each hand according to a standard pay table. Depending on the selected predetermined bonus hand, the preprogrammed method illustrated in FIG. 9 will further include one or more steps to manage the bonus round.

Figure 10:
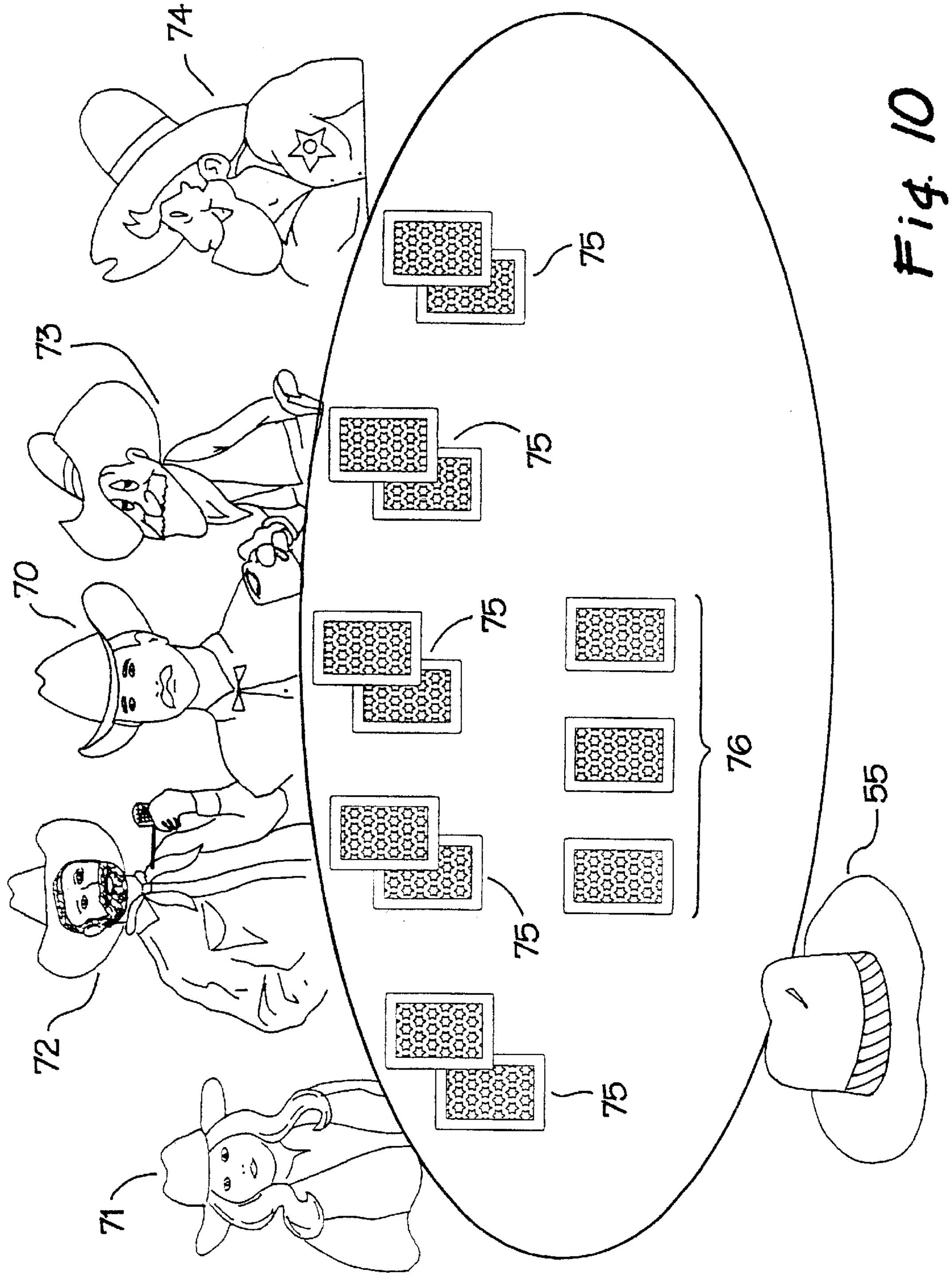
FIG. 10 is a simulated hold'em screen once two initial cards and three common cards have been dealt.
Figure 11:
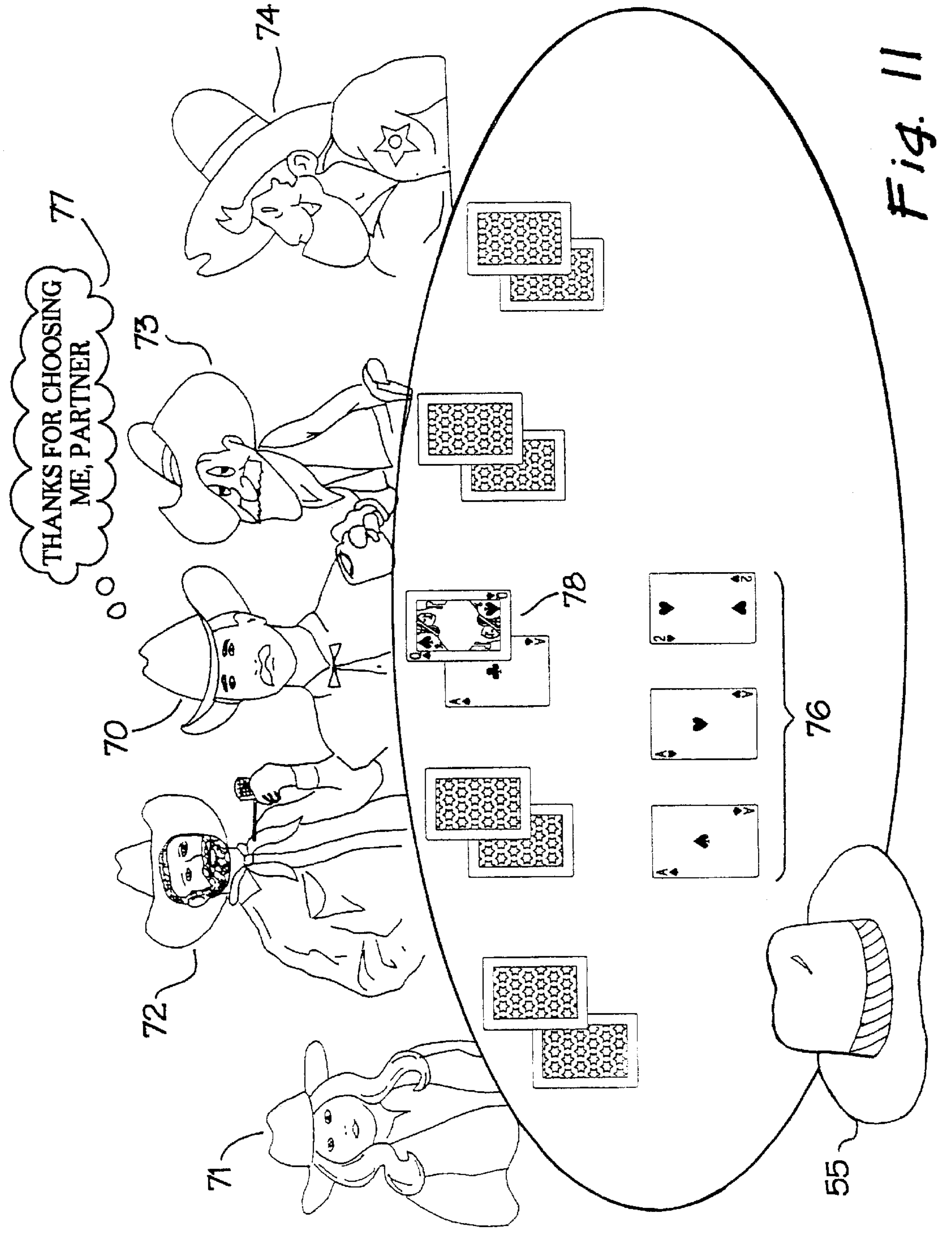
FIG. 11 is a simulated hold'em screen once a hand has been selected by a gaming player.
Figure 12:
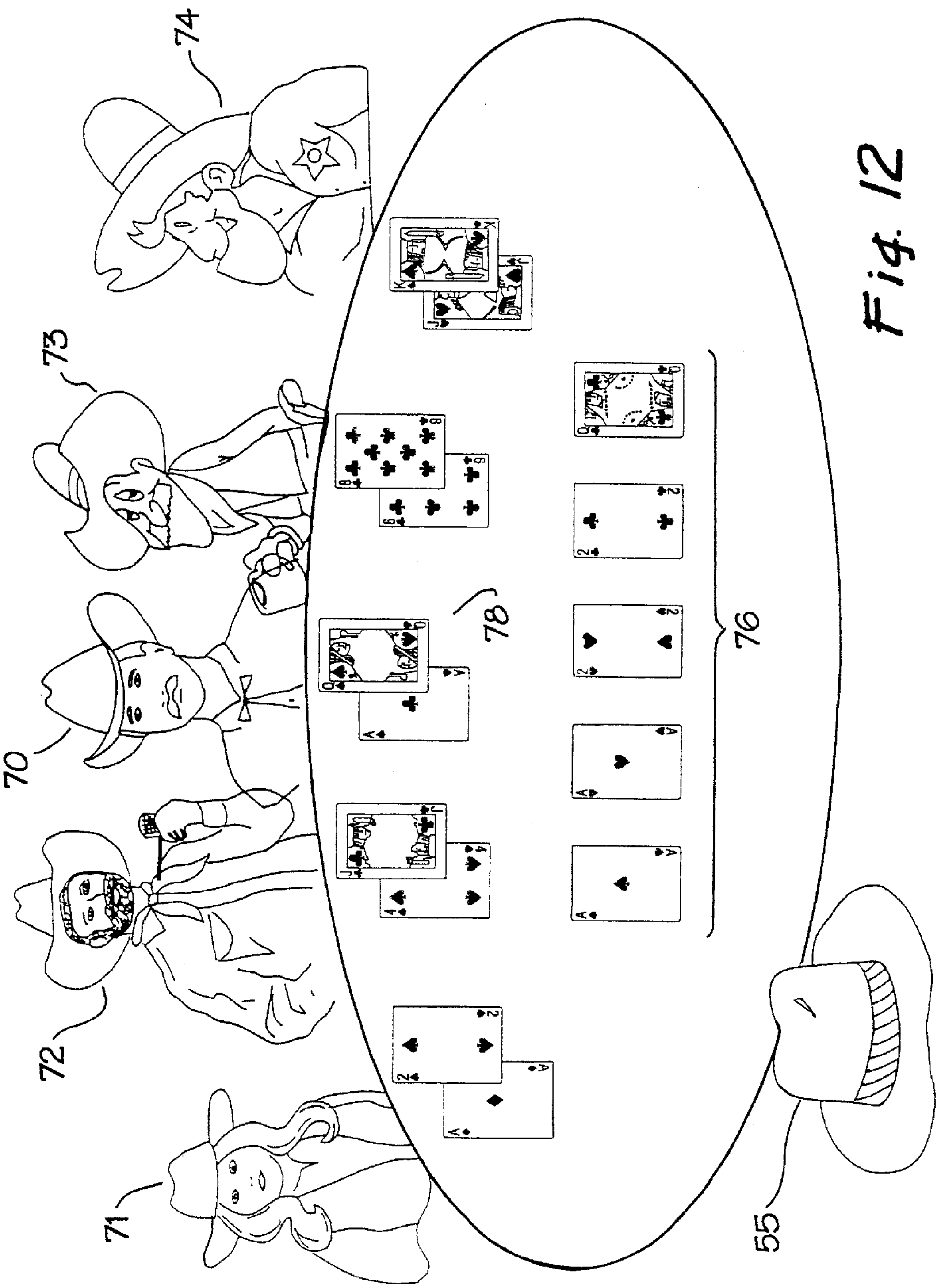
FIG. 12 is a simulated hold'em screen once all cards, including common cards, have been dealt and exposed.

FIG. 10 illustrates a hold'em screen display with each simulated player 70–74 having two cards dealt face down 75 with three initial common cards 76 dealt face down in a center location. At this point in the game the game player selects which hand to play. FIG. 11 depicts the display once the game player has selected the hand to play. As a result of the hand selection, the player also selects a simulated player 70–74. In FIG. 11 player 70 has been selected as evidenced by the player phrase 77 and exposed hand 78. FIG. 12 shows the screen display with each simulated player 70–74 having both cards exposed in combination with all five common cards 76. The player 70 is paid according to a standard pay table based on the cards dealt to the player 70 in combination with the common cards 76 and is paid a predetermined bonus amount if the player 70 holds the highest five card hand at the simulated table.

Certain other aspects and features of the present invention are applicable to any card game selected by a game player. In one embodiment, a game player may fold the selected cards in exchange for the return of a portion of the initial wager made. The decision to fold must be made immediately after the exposure of the player's selected hand as originally dealt. For instance, if the player wagers the maximum allowable coins (e.g. 5 coins) the player is eligible to fold the selected cards for a return of 2 or 3 coins. The gaming machine then progresses to the next new game. In other words, once the player folds, that specific game is concluded. Preferably the fold option is contingent upon the player playing the maximum coins allowable. However, it is not critical that the fold option only be available when maximum coins are played.

Another embodiment of the present invention implements a hierarchy of card suits to decide ties that may occur. In a first embodiment the suits are ranked from highest to lowest as follows: spades, hearts, clubs, diamonds. It should be understood that the specific ranking order is arbitrary. The ranking order is used when a game player and a simulated player hold the same cards, by number, at the conclusion of a game. For example, when the game player holds the Ace of Spades, Ace of Clubs, Jack of Hearts, Ten of Diamonds and Seven of Hearts and the simulated player holds the Ace of Hearts, Ace of Diamonds, Jack of Clubs, Ten of Hearts and Seven of Clubs the hands are essentially identical with each player holding a pair of Aces. However, since the game player holds the Ace of Spades, his or her hand will be declared the winner. In a similar fashion, should the gaming player and a simulated player both hold a flush with five numerically equal cards and the first is a flush in clubs and the second is a flush in diamonds, the flush in clubs is the highest hand. Alternatively, the suits are deemed equal and the game player is awarded only half of the bonus available-in effect, "splitting the pot" with the simulated player.

As referred to above, in yet another embodiment of the present invention certain selected games, namely five card draw and hold'em, may be dealt with one or more cards face up to allow the player to make a semi-informed selection as opposed to a completely arbitrary selection. To account for the revelation of the one or more cards, the pay table can be adjusted to reflect the likelihood the gaming player will more commonly hold the highest hand at the table.

The present invention has been described in detail with respect to a video poker gaming machine within a casino environment. However, the present invention may be implemented over a computer network, including the Internet, as well. The present invention is ideal for Internet gaming as the Internet player must select from the traditional video poker games found in "brick and mortar" casinos. The game is implemented in the same fashion with a gaming player and multiple simulated players.

Although the invention has been described in detail with reference to a preferred embodiment, additional variations and modifications exist within the scope and spirit of the invention as described and defined in the following claims.

I claim:

1. An electronically implemented method of playing a poker game including:

a) accepting a player wager;

b) providing means for said player to select a predetermined number of simulated characters from a pool of unique simulated characters;

c) dealing and displaying a plurality of at least partial poker hands according to conventional poker rules;

d) means for said player to select one of said at least partial poker hands to play;

e) dealing remaining cards to complete said plurality of at least partial poker hands according to conventional poker rules;

f) revealing said player's selected complete poker hand;

g) comparing said completed selected hand to a predefined set of winning hands; and h) if said completed hand is a winning hand, paying said player an award amount according to a preestablished pay table.

2. The method of playing a poker game according to claim 1 wherein said selection of step d) causes cards of said selected at least partial poker hand to be immediately revealed.

3. The method of playing a poker game according to claim 2 wherein all remaining cards of the selected hand are dealt face up.

4. The method of playing a poker game according to claim 1 wherein said poker game is hold'em.

5. The method of playing a poker game according to claim 4 wherein said plurality of at least partial poker hands each comprise two cards face down and three common cards dealt face down and spaced from said plurality of said two cards face down.

6. The method of playing a poker game according to claim 4 wherein said plurality of at least partial poker hands each comprise two cards, one or both dealt face up, and three common cards dealt face down and spaced from said plurality of said dealt two cards.

7. The method of playing a poker game according to claim 1 wherein said poker game is seven card stud.

8. The method of playing a poker game according to claim 1 wherein said poker game is five card stud.

9. The method of playing a poker game according to claim 1 wherein said poker game is five card draw.

10. The method of playing a poker game according to claim 1 further comprising the step of allowing the player to fold the selected hand between steps d) and e).

11. An electronically implemented method of playing a poker game including:

a) accepting a player a wager;

b) dealing and displaying a plurality of at least partial poker hands according to conventional poker rules, each plurality of at least partial poker hands including a unique simulated character associated therewith;

c) providing means for said player to select one of said at least partial poker hands to play;

d) distinguishing said simulated character corresponding to said player's selection of one of said at least partial poker hands;

e) dealing remaining cards to complete said plurality of at least partial poker hands according to conventional poker rules;

f) revealing said player's selected complete poker hand;

g) comparing said completed selected hand to a predefined set of winning hands;

h) if said completed hand is a winning hand, paying said player an award amount according to a preestablished pay table;

i) revealing each unselected poker hand dealt; and j) paying the player a bonus amount if said player's poker hand is the highest poker hand revealed.

12. An electronically implemented method of playing a poker game including:

a) accepting a player wager;

b) dealing and displaying a plurality of at least partial poker hands according to conventional poker rules;

c) providing means for said player to select one of said at least partial poker hands to play;

d) dealing remaining cards to complete said plurality of at least partial poker hands according to conventional poker rules;

e) revealing said player's selected complete poker hand;

f) comparing said completed selected hand to a preestablished set of winning hands;

g) if said completed hand is a winning hand, paying said player an award amount according to a preestablished pay table;

h) revealing each unselected poker hand dealt;

i) paying the player a bonus amount if said player's poker hand is the highest poker hand revealed;

j) dealing a poker game bonus round contingent upon said player receiving a predefined poker hand comprising;

i. dealing and displaying a second plurality of at least partial poker hands according to conventional rules;

ii. providing means for said player to select one or more of said at least partial poker hands;

iii. completing said one or more of said selected partial poker hands;

iv. comparing said selected completed poker hands to a second preestablished set of winning hands; and v. paying said player according to a second preestablished pay table based on the strength of the one or more selected five card hands.

13. The method of claim 12 wherein the predefined poker hand is four of a kind.

* * * * *